United States Patent

Rosenvinge

[11] Patent Number: 5,544,395
[45] Date of Patent: Aug. 13, 1996

[54] CLAMPING DEVICE FOR A TEXTILE EDGE

[76] Inventor: Carl Cilius Rosenvinge, Sneppevej 97, DK-8723 Lösning, Denmark

[21] Appl. No.: 256,978
[22] PCT Filed: Feb. 5, 1993
[86] PCT No.: PCT/DK93/00042
 § 371 Date: Aug. 3, 1994
 § 102(e) Date: Aug. 3, 1994
[87] PCT Pub. No.: WO93/15622
 PCT Pub. Date: Aug. 19, 1993

[30] Foreign Application Priority Data

Feb. 7, 1992 [DK] Denmark ................... 0156/92

[51] Int. Cl.$^6$ ................................................ B42F 1/00
[52] U.S. Cl. .................................. 24/460; 24/365 EC
[58] Field of Search ...................... 24/460, 462, 477, 24/194, 171, 265 EC

[56] References Cited

U.S. PATENT DOCUMENTS

| 1,332,442 | 3/1920 | Kane | 24/460 |
| 1,639,609 | 8/1927 | Hofland . | |
| 2,125,540 | 8/1938 | Carlson | 24/477 |
| 2,260,378 | 10/1941 | Hoffland | 24/196 |
| 2,866,249 | 12/1958 | Normandin | 24/460 |
| 3,002,240 | 10/1961 | Laguerre | 24/30.5 L |
| 3,096,766 | 7/1963 | Patton | 24/30.5 L |
| 3,309,742 | 3/1967 | Chin | 24/30.5 L |
| 4,686,748 | 8/1987 | Kaivanto | 24/460 X |
| 4,956,899 | 9/1990 | Green | 24/483 |
| 5,207,725 | 5/1993 | Pinkerton | 24/30.5 LX |

FOREIGN PATENT DOCUMENTS

| 1306881 | 12/1962 | France | 24/30.5 L |
| 1508297 | 11/1966 | France . | |
| 252886 | 1/1912 | Germany . | |
| 2215766 | 9/1989 | United Kingdom | 24/460 |

Primary Examiner—Peter M. Cuomo
Assistant Examiner—Robert J. Sandy
Attorney, Agent, or Firm—Jacobson, Price, Holman & Stern, PLLC

[57] ABSTRACT

A clamping device for a textile edge (14) comprise an inner wedge shaped casing (2) with an insertion opening for the textile edge (14) and a slide element arranged in the casing slidably away form and toward the wedge point of the casing to a clamping position, wherein the slide element and the one inner side (10) of the casing having a mutually low friction against said displacement, and the other inner side (12) of the casing has a relativelyhigher friction against a textile material. Since the inner sides (10, 12) of the casing (2) diverge against the insertion opening, and the slide element (6) forms a supporting means for the casing and is provided with a connecting means (8) for fastening of the clamping device to a suspension means (18) for the clamping device, is achieved—in addition to the clamping device in known way adapting itself to a clamping force proportional to the pulling force attempting to pull the textile edge out of the clamping device—that the mounting of the clamping device on a textile edge and the removal thereof from the textile edge is facilitated, since the slide element of the clamping device forms the suspending means itself for the casing.

8 Claims, 4 Drawing Sheets 5,544,395

CLAMPING DEVICE FOR A TEXTILE EDGE

BACKGROUND OF THE INVENTION

The invention relates to a clamping device for an elongated textile edge, such as a waistband, a tarpaulin edge or the like, which edge preferably is longer than the width of the clamping device, and comprising an inner wedge shaped casing with an insertion opening for the textile edge and a slidably displaceable slide element arranged in the casing slidable away from and towards the wedge point of the casing for a clamping position, said slide element and the one inner side of the casing have a mutually low friction against said displacement, and the other inner side of the casing having a relatively higher friction against a textile material.

Such clamping device is known from DE-PS 858,234, wherein the inner sides of the casing converge towards the insertion opening, and the casing itself forms the supporting means for the slide element and the textile edge clamped in the clamping device. The wedge shaped casing is provided with a connecting means in the shape of a ring for securing the clamping device to a suspension means for the clamping device in the shape of a strap.

In U.S. Pat. No. 2,260,378 a belt buckle is disclosed, in which the wedge forming sides of the casing diverge against the insertion opening, but said buckle is able only to clamp or pinch a belt and not e.g. a tarpaulin edge.

Contrary to said known art the clamping device according to the present invention is characterized in that the casing is shaped like an U, having a U-bottom and two U-legs, and the inner surfaces of the U-legs extend divergingly towards the insertion opening, that the slide element forms a supporting or anchoring means for the casing, and that the sliding element is provided with a guiding and fastening connecting means extending perpendicularly to the bottom of the U for the fastening of the clamping device to a suspension means for the clamping device, so that the slide element when the clamping device thus in connected condition is slidably displaceable between the inner bottom surface of the U and at least to the mouth of the insertion opening. As a consequence of the fact that the inner surfaces of the legs of the U diverge against the insertion opening, is achieved-beyond the clamping device in a known manner is adapting itself to a clamping force proportional to the pulling force attempting to pull the textile edge out of the clamping device—that the mounting of the clamping device perpendicularly to a textile edge and its removal again from the textile edge is facilitated, because the slide element of the clamping device forms the supporting means itself for the casing. Furthermore, the casing, other things being equal, may be made from a weaker material, e.g. plastic, and thus be economically produced. The mounting of the clamping device takes place by insertion of a textile edge extending crosswise to the tractive force direction of the clamping device, into the insertion opening of the clamping device between the slide element and that the inner surface of the leg of the U having the mentioned high friction coefficient to textile material and with the U-shaped casing in its most withdrawn position from the slide element, and as soon as the textile edge is inserted in the casing crosswise thereto, the slide element is pulled into the inner of the casing in the direction towards the bottom of the U-form of the casing for the pinching and securing of the textile edge, at the same time while the casing is maintained engaged to the edge by its friction thereto.

In the following text a textile edge is e.g. the edge of a tarpaulin, tent canvas, canvas, pants., stocking, laundry or similar edge areas of flexible flat products.

In the following text a suspension means for the clamping device is at least a strap, becket, rope, screw, hook, press button, snap fastener and similar means for suspending, securing or fastening of the clamping device, and a slide element in the casing of another clamping device may alternatively be a suspension means.

BRIEF DESCRIPTION OF THE DRAWINGS

The invention will now be described in more detail in connection with some embodiments and with reference to the drawing in which as shown in FIG. 12 for a snap or click lock assembly.

DESCRIPTION OF THE PREFERRED EMBODIMENTS

The clamping device according to the invention can be made of flexible resilient as well as of rigid materials, such as plastic, metal, steel, glass and stone material. In case the casing material is flexible and resilient, only the innermost inner surface parts of the casing near the bottom of the U-shape need be diverging, while the outermost inner surface parts at the insertion opening may be parallel. This is due to the fact that the casing at the bottom of its U-shape by flexible and resilient materials are considerably more rigid due to a larger wall thickness and/or due to the U-shape itself.

Figure 1:
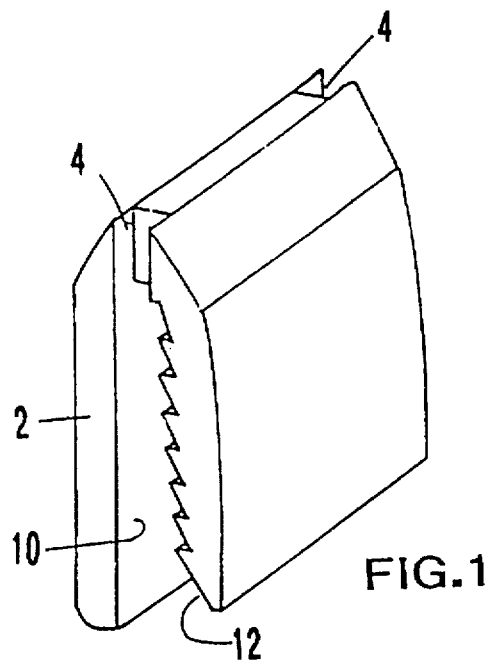
FIG. 1 shows an embodiment for an inner wedge shaped casing for the clamping device.
Figure 2:
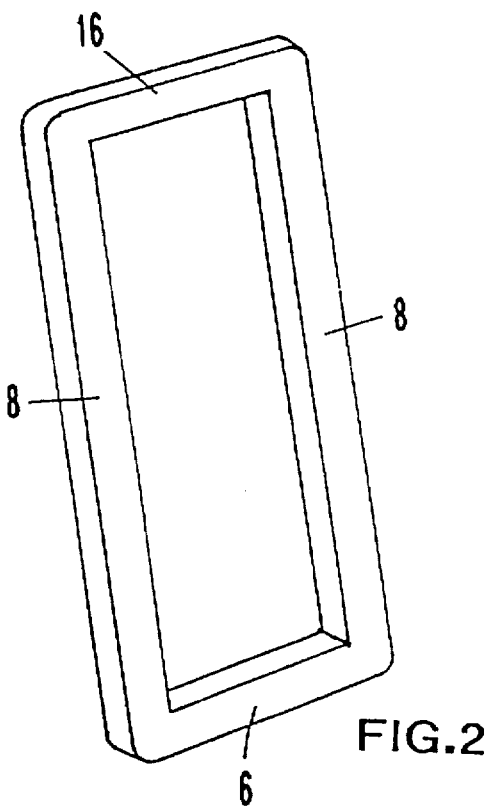
FIG. 2 shows a slide element with connecting means for a slidable displacement in the casing of the clamping device.
Figures 3, 4:
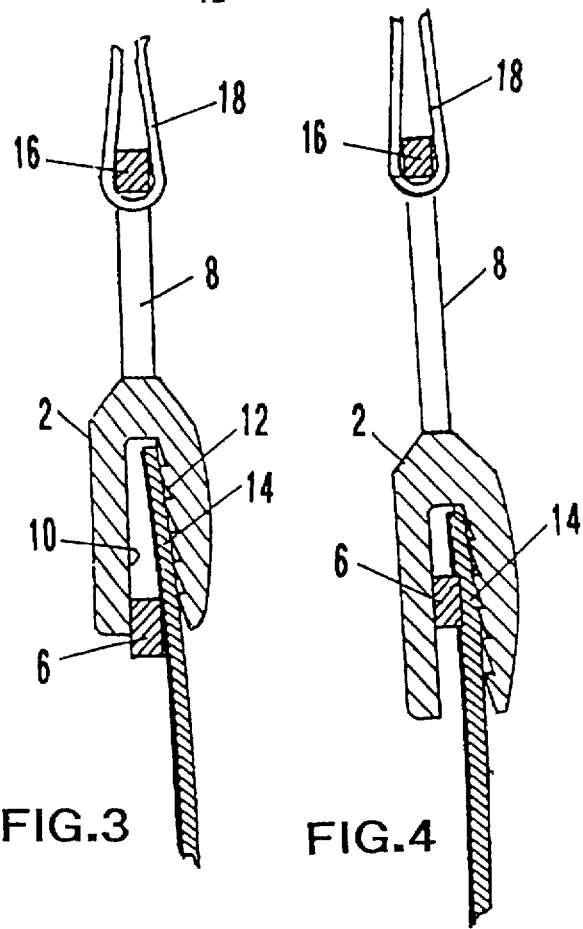
FIG. 3 shows a longitudinal section of a slide element according to FIG. 2 and a casing according to FIG. 1 with the slide element in its advanced position for insertion of a textile edge in the clamping device.
FIG. 4 shows the items of FIG. 3, but with the slide element in a retracted clamping position for securing or fastening of the textile edge to the clamping device.

In the embodiment of FIG. 1 the casing 2 is at its innermost end provided with guiding recesses 4 for the connecting means 8 of the slide element 6 shown in FIG. 2 for securing of a parallel displacement of the slide element 6 along the smooth inner side wall 10 of the casing at low friction. The opposite inner side wall 12 of the casing has a jagged cross section for engagement with a textile edge 14 inserted in the casing. Said textile edge is shown in figs. 3 and 4. Instead of shaping the inner diverging side wall 12 of the casing with a jagged cross section, the inner side of the side wall may be made rough in another way or may be covered with a friction material, such as caoutchouc, possibly with a surface pattern. The part of the connecting means 8 opposite to the slide element 6 may be shaped as a beam 16 as shown in FIG. 2 for engagement with a strap 18 being arranged around said beam 16 as shown in FIGS. 3 and 4.

Figure 5A:
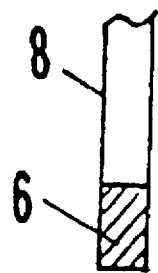
FIG. 5 shows examples of cross section shapes for the slide element.
Figure 5B:
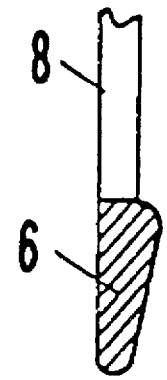
Figure 5C:
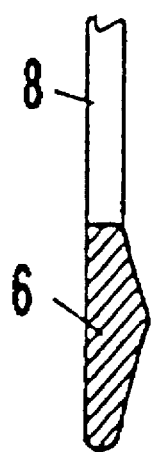
Figure 5D:
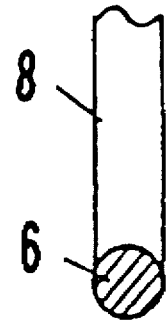

FIG. 5 shows some examples of cross sections for the slide element 6, where the cross section in FIG. 5a causes a clamping of the textile edge 14 by line touch, which is advantageous for securing solid textile edges, while FIGS. 5b and d cause a slightly larger clamping area between slide element 6 and textile edge 14 for a more gentle fastening of the textile edge 14, and finally the embodiment of FIG. 5c cause a considerably larger area touch since the upper area of the slide element gets practically parallel to the frictional inner side 12 of the casing, which makes the slide element well suited for textile edges 14 of sensible material.

Figure 6:
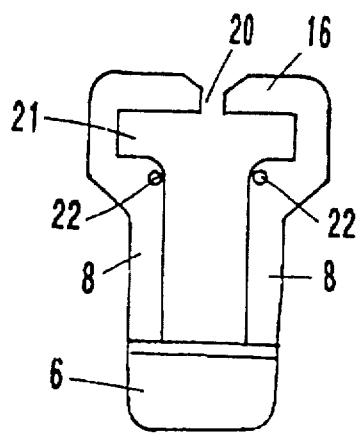
FIG. 6 shows another embodiment of a slide element with a connecting means for fastening of the clamping device to a strap or a brace.
Figure 7:
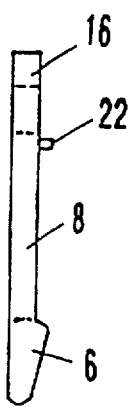
FIG. 7 shows a side view of the items of FIG. 6.
Figure 8:
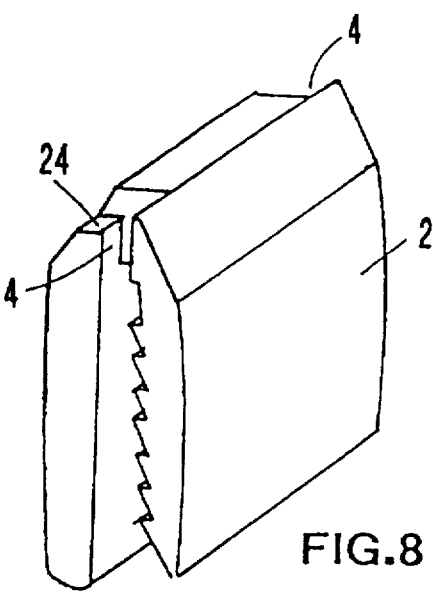
FIG. 8 shows a casing with a stop means for limitation of the displacement distance of the slide element in the casting.

FIGS. 6 and 7 show a slide element 6, the connecting means 8 of which have an opening 20 for insertion of a loop of a band shaped material, which facilitates the mounting thereof. Said opening may of course be omitted, especially of the existing traction forces in the band shaped material are high, but in that case the band should be pulled through the band slit of the slide element 21. The connecting means 8 of the slide element is also provided with stop cams 22 for limitation of the discharge from the casing of the slide element 6. In this case the casing may preferably as shown in FIG. 8 be provided with accordingly shaped abutments 24 at both recesses 4 of the casing.

Figure 9:
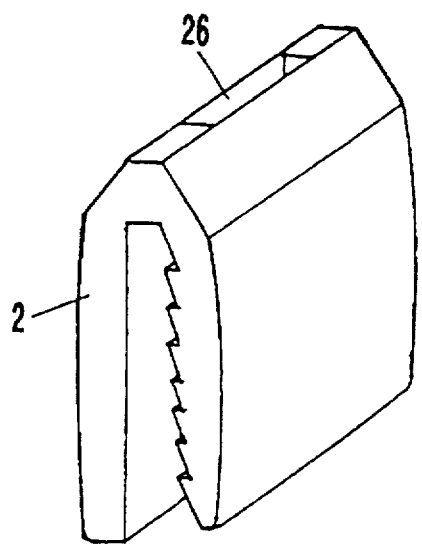
FIG. 9 shows an embodiment of a casing for a central suspension thereof on the connecting means of the slide element.
Figure 10:
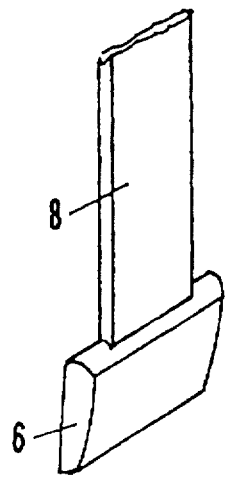
FIG. 10 shows a slide element for use in the casing according to FIG. 9.
Figure 11:
FIG. 11 shows an end modification of the connecting means of the slide element.
Figure 12:
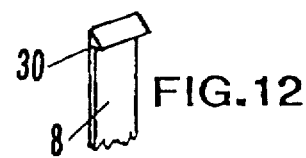
FIG. 12 shows another end modification of the connecting means of the slide element.
Figure 13:
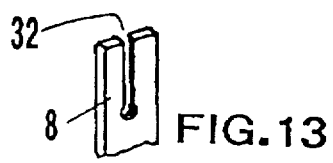
FIG. 13 shows a third end modification of the connecting means of the slide element.

FIG. 9 shows an embodiment of the casing 2 for smaller influences, where the connecting means 8 of the slide element 6 extends out through the casing at the innermost end thereof through a slit 26 guiding the connecting means 8 during the displacement of the slide element in the casing. The end of the connecting means 8 opposite to the slide element 6 may, as shown in FIG. 11 be provided with needling loops 28, as shown in FIG. 12 be provided with a hook 30 or as shown in FIG. 13 be provided with a locking slit 32 for engagement with a correspondingly shaped part in a mounting means for the connecting means 8. Also other embodiments are relevant, adapted to the items being supported by and secured to the clamping device according to the invention.

Figure 14:
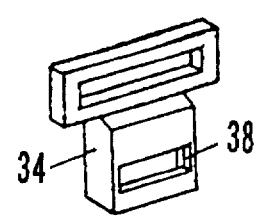
FIG. 14 shows a suspension or strap connection eye for connecting onto the connecting means of the slide element when said connecting means-has an end shape e.g.
Figure 15:
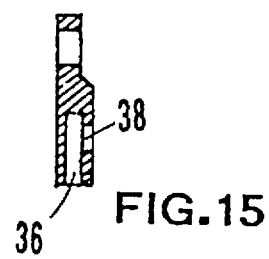
FIG. 15 shows a longitudinal section of the connection eye of FIG. 14.

FIG. 14 shows a fastening loop 34 for suspension, e.g. in a suspender extending through the loop, and where the lower part of the loop is shaped as shown in FIGS. 14 and 15 for engagement with the embodiment of FIG. 12 with a hook 30 which may enter a slit 36 and enter a click locking engagement with a slit 38 provided perpendicularly thereto.

Figure 16:
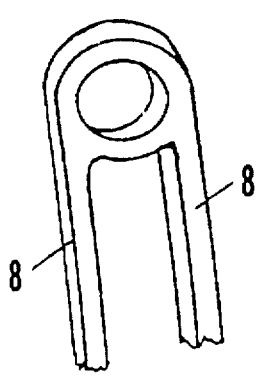
FIG. 16 shows an alternative end modification of the connecting means for the slide element according to FIGS. 2 and 5–7.

FIG. 16 shows an end shape of the connecting means 8 where the clamping device should be secured to a cable, a rope, a stay or the like.

Figure 17:
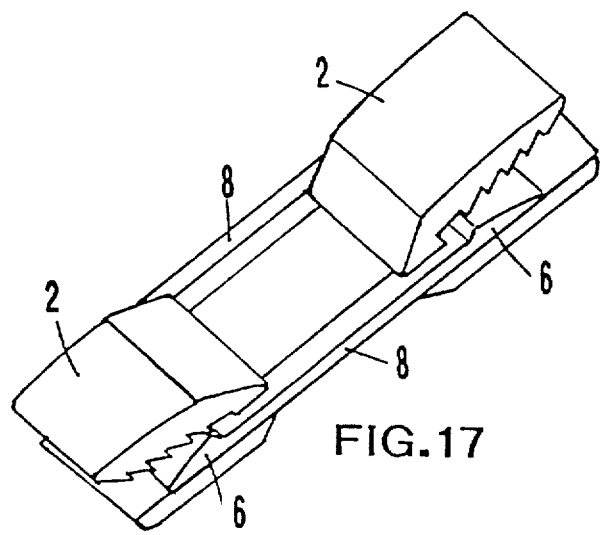
FIG. 17 shows a double clamping device having a slide element in each of two casings and a common connecting means for the two slide elements.

FIG. 17 shows an embodiment of the clamping device with a casing and a slide element in both ends, where the slide elements 6 have common connecting means 8. Said embodiment has many applications, of which can be mentioned a braces or a suspenders clip, in which the one slide element is in engagement with a brace end, and The other slide element is in engagement with a trousers edge. The construction may generally apply where two textile edges should be mutually pulling force connected, such as connection element between brace girths which should be extended, assembly of tarpaulins etc. A connecting means with three or more slide elements may easily be provided with three or more casings for providing a multiple clamping device.

Figure 18:
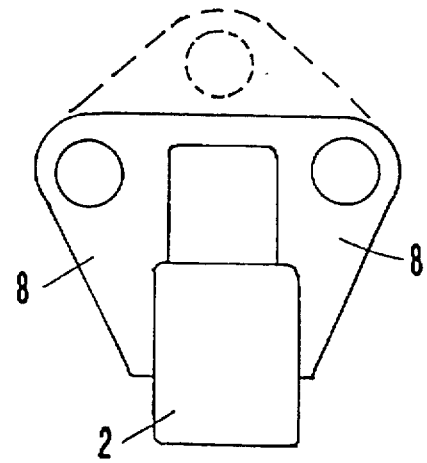
FIG. 18 shows an embodiment of a clamping device in which the connecting means of the slide element is provided with two or three mounting eyes for fastening of the clamping device to suspension means, such as stays.
Figure 19:
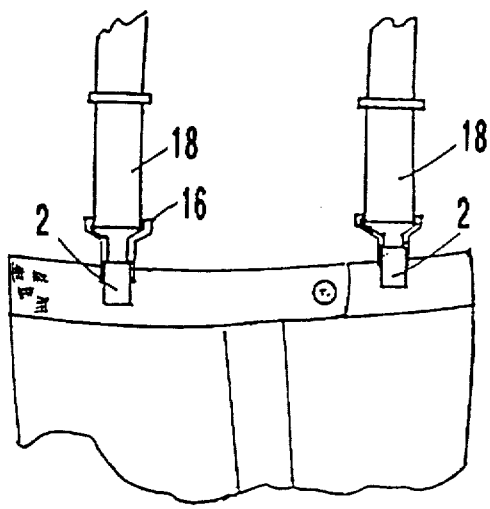
FIG. 19 shows the clamping device used with braces or suspenders for pants, e.g. the embodiment of FIGS. 1 and 6 for casings and slide element.
Figure 20:
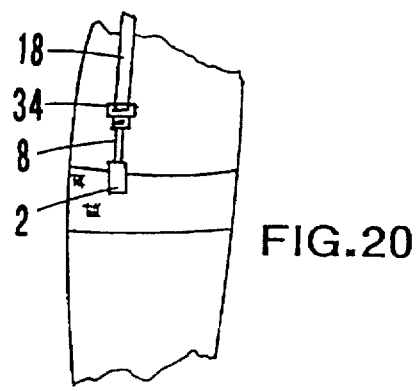
FIG. 20 shows the clamping device used with a stocking suspender or garter, e.g. with a casing, slide element and connecting means as shown in FIGS. 9, 10, 12, 14 and 15.
Figure 21:
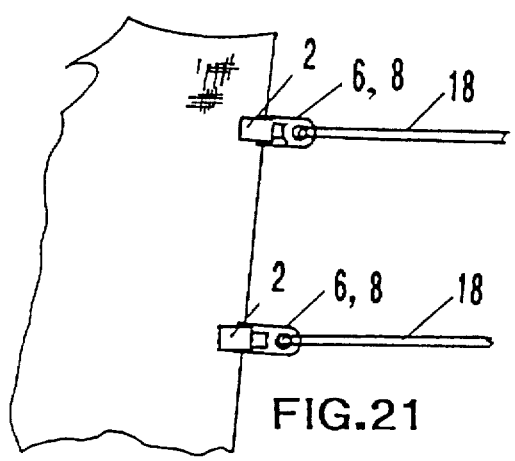
FIG. 21 shows the clamping device used for securing of the edge of a tarpaulin or a sail by means of connecting means as shown in FIG. 16.
Figure 22:
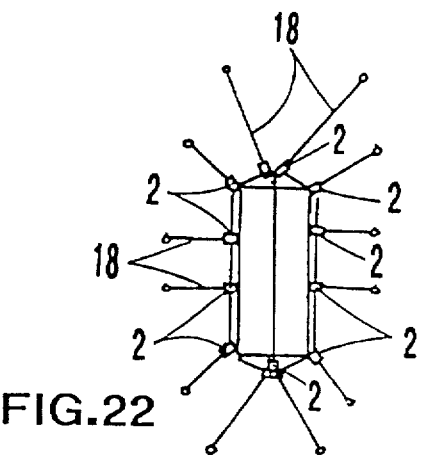
FIG. 22 shows the clamping device used for fastening of tent canvas edges as substitute for metal eyelets and for securing of the canvas edges to tent stays.

FIG. 18 shows an embodiment for the clamping device adapted so that it might be connected to a textile edge and to two or three stays as well, e.g. for use by tents or tarpaulins. It will be understood that the connecting means 8 also may be shaped as part of a press button or snap lock, so that the clamping device before or after being secured to a textile edge can have the connecting means hooked to the counter part of the snap lock.

FIGS. 19–22 show different applications for the clamping device according to the invention as braces or suspenders clamping device, suspender for stockings, sail canvas or tarpaulin clamping device, respectively, and as stay strap clamping device, when the clamping devices according to the invention are clamped onto tent canvas edges.

The clamping device according to the invention thus also replaces the hitherto used metal eye mounting holes in tarpaulins, sail canvas and tent canvas for the fastening of stays and the like.

I claim:

1. In a clamping device comprising a casing, being U-shaped in cross section, defined by two U-legs joined by a U-bottom, each of said U-legs having inner side walls, an insertion opening between the U-legs for receiving at least a portion of an article to be clamped, said insertion opening having a mouth, and a slide element arranged in the casing for displacement away from and towards a clamping position, wherein one of said inner side walls having a high friction surface relative to the other inner side wall, said other inner side wall having a low friction surface enabling displacement of the slide element relative to the casing, the improvement which comprises: the inner side walls of the U legs, at least proximal the U-bottom, diverge outwardly in a direction toward the insertion opening thereby providing an inner wedge; the slide element is a supporting means for the casing; and the slide element is provided with connecting means, one part of which extends perpendicularly to the U-bottom of the casing, for connecting the clamping device to a suspension means, such that the slide element, when the clamping device is in a connected condition, is displaceable between, a region of the inner wedge proximal to the U-bottom, and at least the mouth of the insertion opening and the casing further comprises a slit in the U-bottom, capable of receiving therethrough the connecting means, wherein the slit guides the displacement of the slide element relative to the casing.

2. The clamping device according to claim 1, wherein the high friction surface of the one inner side wall further comprises a jagged cross section for engaging with an article to be clamped.

3. The clamping device according to claim 2, wherein the slide element further comprises, at least in part, a shape commensurate with the jagged cross section.

4. The clamping device according to claim 1, further comprising the connecting means having two ends, wherein the slide element is positioned at one of said ends and the other end of the connecting means is provided with a means for securing the clamping device.

5. The clamping device of claim 1 further comprising the connecting means having two ends, wherein the sliding element and casing are positioned at one of the ends and a second sliding element and second casing are positioned at the other end.

6. The clamping device of claim 1 wherein displacement of the sliding element relative to the casing creates a clamping force proportional to the pulling force of the article being clamped.

7. In a clamping device comprising a casing, being U-shaped in cross section, defined by two U-legs joined by a U-bottom, each of said U-legs having inner side walls, an insertion opening between the U-legs for receiving at least a portion of an article to be clamped, said insertion opening having a mouth, and a slide element arranged in the casing for displacement away from and towards a clamping position, wherein one of said inner side walls having a high friction surface relative to the other inner side wall, said other inner side wall having a low friction surface enabling displacement of the slide element relative to the casing, the improvement which comprises: the inner side walls of the U legs, at least proximal the U-bottom, diverge outwardly in a direction toward the insertion opening thereby providing an inner wedge; the slide element is a supporting means for the casing; and the slide element is provided with connecting means, one part of which extends perpendicularly to the U-bottom of the casing, for connecting the clamping device to a suspension means, such that the slide element, when the clamping device is in a connected condition, is displaceable between, a region of the inner wedge proximal to the U-bottom, and at least the mouth of the insertion opening and two recesses located at each side of the U-bottom of the casing for guiding displacement of the slide element relative to the low friction surface of the inner side wall.

8. The clamping device according to claim 7, wherein the connecting means further comprises stop cams and the casing further comprises abutments which, when in contact with the stop cams, limit displacement of the slide element relative to the casing.

* * * * *